US005632020A

United States Patent [19]
Gephardt et al.

[11] Patent Number: 5,632,020
[45] Date of Patent: May 20, 1997

[54] SYSTEM FOR DOCKING A PORTABLE COMPUTER TO A HOST COMPUTER WITHOUT SUSPENDING PROCESSOR OPERATION BY A DOCKING AGENT DRIVING THE BUS INACTIVE DURING DOCKING

[75] Inventors: Douglas D. Gephardt, Austin; Scott Swanstrom, Cedar Park, both of Tex.

[73] Assignee: Advanced Micro Devices, Inc., Austin, Tex.

[21] Appl. No.: 255,663

[22] Filed: Jun. 9, 1994

Related U.S. Application Data

[63] Continuation-in-part of Ser. No. 217,951, Mar. 25, 1994, abandoned.

[51] Int. Cl.⁶ .................. G06F 13/14; G06F 13/20; G06F 13/36; G06F 13/40
[52] U.S. Cl. .................. 395/283; 395/281; 395/287; 395/288; 364/231.1; 364/240; 364/242.7
[58] Field of Search .................. 395/750, 700, 395/283, 281, 287, 288; 364/231.1, 240, 242.7

[56] References Cited

U.S. PATENT DOCUMENTS

| | | | |
|---|---|---|---|
| 4,530,069 | 7/1985 | Desrochers | 395/822 |
| 4,769,764 | 9/1988 | Levanon | 361/680 |
| 4,969,830 | 11/1990 | Daly et al. | 439/136 |
| 4,999,787 | 3/1991 | McNally et al. | 364/514 |
| 5,030,128 | 7/1991 | Herron et al. | 439/372 |
| 5,052,943 | 10/1991 | Davis | 439/357 |
| 5,126,954 | 6/1992 | Morita | 361/683 |
| 5,175,671 | 12/1992 | Sasaki | 361/686 |
| 5,187,645 | 2/1993 | Spalding et al. | 361/686 |
| 5,195,183 | 3/1993 | Miller et al. | 395/200.2 |
| 5,210,855 | 5/1993 | Bartol | 395/500 |
| 5,241,542 | 8/1993 | Natarajan et al. | 370/311 |
| 5,265,238 | 11/1993 | Canova, Jr. et al. | 395/651 |
| 5,313,596 | 5/1994 | Swindler et al. | 395/325 |
| 5,317,697 | 5/1994 | Husak et al. | 395/325 |
| 5,323,291 | 6/1994 | Boyle et al. | 361/683 |
| 5,353,417 | 10/1994 | Fuoco et al. | 395/325 |
| 5,386,567 | 1/1995 | Lien et al. | 395/700 |
| 5,394,552 | 2/1995 | Shirota | 395/750 |
| 5,488,572 | 1/1996 | Belmont | 364/514 R |
| 5,526,493 | 6/1996 | Shu | 395/281 |
| 5,530,810 | 6/1996 | Bowman | 395/281 |

FOREIGN PATENT DOCUMENTS

| | | |
|---|---|---|
| 0426134A2 | 5/1991 | European Pat. Off. . |
| 0426134A3 | 5/1991 | European Pat. Off. . |
| 0637793A1 | 2/1995 | European Pat. Off. . |
| WO94/09425 | 4/1994 | WIPO . |

OTHER PUBLICATIONS

HPSIR, Special Infrared Communications Specification, introduction pages and pp. 1–9.

*Primary Examiner*—Thomas C. Lee
*Assistant Examiner*—Ki S. Kim
*Attorney, Agent, or Firm*—Foley & Lardner

[57] ABSTRACT

A computer system includes a bus arbiter for providing immediate access to a bus in response to an external requirement or event. In a dockable computer system capable of hot docking or warm docking, the bus arbiter grants exclusive, non-preemptive access to the buses to the docking agent which is capable of quieting (rendering inactive) the bus of the portable computer and docking station in response to a notice signal. The notice signal is indicative of a change of states from the undocked state to the docked state or from the docked state to the undocked state. The notice signal may be provided from software, a user-actuated switch, or an infrared signal. In an audio-capable computer, the bus arbiter provides exclusive non-preemptive access to the digital signal processing peripheral device so that audio glitches are avoided. The arbiter preferably includes an override circuit for countermanding the fairness scheme employed by the bus arbiter and granting immediate bus access in response to the external event or condition. The bus arbiter preferably is able to provide fixed or rotating priority for bus accesses of other peripheral devices on the bus. The arbiter is preferably integrated with the main processor of the computer system.

24 Claims, 6 Drawing Sheets

SYSTEM FOR DOCKING A PORTABLE COMPUTER TO A HOST COMPUTER WITHOUT SUSPENDING PROCESSOR OPERATION BY A DOCKING AGENT DRIVING THE BUS INACTIVE DURING DOCKING

RELATED APPLICATIONS

The present application is a continuation-in-part application of U.S. patent application Ser. No. 08/217,951, filed Mar. 25, 1994, abandoned, entitled "An Apparatus and Method for Achieving Hot Docking Capabilities for a Dockable Computer System," assigned to the assignee of the present invention. The present application is also related to U.S. Pat. application Ser. No. 08/217,952, filed Mar. 25, 1994, entitled "A Dockable Computer System Capable of Electric and Electromagnetic Communication," assigned to the assignee of the present invention.

TECHNICAL FIELD

The present invention relates generally to a computer system including a processor, a bus arbiter, and several bus masters coupled together on at least one bus, and more particularly to a bus arbiter for granting control of the at least one bus to one of the bus masters in response to an external requirement or event.

BACKGROUND OF THE INVENTION

Computer systems generally include a number of peripheral devices coupled together on a bus. The peripheral devices perform a variety of data storage, computational, data manipulation, display, control and audio functions for the computer system. The peripheral devices are often bus masters—devices which are capable of initiating a read or a write transaction on the bus. The peripheral devices initiate and complete transactions on the bus as they efficiently perform their respective operations without unnecessarily burdening the CPU, other peripheral devices or other system resources.

Computer systems having a number of bus masters employ a bus arbiter to assign ownership or control of the bus when one or more bus masters attempt to access it. Bus arbiters generally include a number of request-input and grant-output pairs, each pair associated with a particular bus master. When a bus master needs to access the bus to perform an operation, it provides a bus request signal to the bus arbiter. When the bus arbiter determines that the requesting bus master may have access to the bus, the bus master provides a grant signal. When the bus master receives the bus grant signal, the bus master has access to the bus and performs the operation.

When two or more bus masters simultaneously request access to the bus, the bus arbiter determines which master should be granted access and which master should be denied access. The arbiter follows a fixed or rotational priority scheme when granting access to the bus. A fixed priority scheme assigns a priority order to each bus master and grants ownership of the bus in accordance with that priority order; a rotational priority scheme changes the priority order of each bus master over time in accordance with an algorithm, program or other method.

Prior art bus arbiters, whether fixed or rotational, employ a fairness scheme (lock control) which overrides the priority scheme and temporarily reassigns the priority order to prevent a locking error on the bus. A locking error may be a lockout, deadlock, livelock or other arbitration condition which causes errors or inefficiencies on the bus. Locking errors may even cause fatal system errors or hardware crashes.

Lockout errors can permanently prohibit a peripheral device from obtaining access to the bus. For example, a lower priority bus master may be locked out if two high priority bus masters on a peripheral component interconnect (PCI) bus attempt simultaneously to access the lower priority bus master when it is locked (being held for the exclusive use of an initiator of an access). To prevent such an error, the fairness scheme countermands the priority scheme and guarantees the lower priority bus master access to the bus.

Additionally, the fairness scheme is necessary to prevent locking errors such as deadlocks or livelocks. Deadlocks and livelocks occur when each of two bus masters must wait for a response from the other before an operation on the bus can be completed. Such a deadlock or livelock can be due to locked/exclusive bus transactions in combination with write back cache transactions. Also, deadlocks and livelocks may occur when an access is unable to be completed because other bus masters are utilizing necessary system resources.

The fairness scheme even overrides a fixed priority scheme to prevent locking errors. Therefore, prior art arbiters are not capable of guaranteeing a particular bus master access to the bus in a particular amount of time (a time-bound access) because the fairness scheme can override the access by the particular bus master. Thus, although the fairness scheme is necessary to prevent locking errors, the fairness scheme disadvantageously prevents the bus arbiter from providing an exclusive (highest priority), non-preemptive (non-interruptable) bus access.

Particular computer systems such as dockable computer systems and audio-capable computer systems are subject to decreased performance or even catastrophic failure if the systems do not respond immediately to an external situation (requirement or event). In these types of systems, a particular peripheral device must be given access to the bus for the system to respond to the external situation. Because the external situation often demands an immediate response, a bus arbiter is needed which provides an exclusive, non-preemptive access to the bus so the particular peripheral device may quickly respond to the external situation.

More particularly, an external event such as a docking event in a dockable computer system requires a peripheral device or CPU undertake protective measures to prevent signaling failures, bus crashes and component damage caused by physically connecting or disconnecting active buses of the system. The active buses of the dockable computer system may be advantageously protected by a docking agent, CPU, or other circuitry which quiets the active buses in response to the docking event. Exemplary docking agents, CPUs and other circuitry are discussed in U.S. Pat. application Ser. No. 08/217,951, filed Mar. 25, 1994, entitled "An Apparatus and Method for Achieving Hot Docking Capabilities for Dockable Computer."

Generally, the docking agent must receive ownership of the bus as soon as possible. Any time spent waiting for the bus arbiter to grant ownership is disadvantageous because the docking event may have to be delayed until ownership is granted. Further, prior art bus arbiters may preempt the control of the bus by the docking agent during the docking event thereby causing a catastrophic failure. Thus, there is a need for a dockable computer system which includes a bus arbiter optimized for responding to an impending docking event.

An external requirement such as the prevention of a "sound glitch" in an audio-capable computer system requires digital data representative of a sound wave to be procured within the stringent timing demands of digital sound production. Audio-capable computer systems generally employ a digital signal processing peripheral device to generate the digital data representative of the sound wave. If the peripheral device does not produce the digital data in the requisite time, the sound wave may contain an audibly noticeable "sound glitch" which affects the integrity of the sound wave and often annoys the user. Excess time spent waiting for the bus arbiter to grant ownership of the bus to the peripheral device delays the generation of the digital data, thereby causing the "sound glitch." Thus, there is a need for an audio-capable computer system including a bus arbiter optimized for preventing "sound glitches."

Thus, there is a need for a bus arbiter which is able to grant access to the bus in response to an external event or requirement. More particularly, there is a need for a bus arbiter which includes a dedicated request/grant pair which provides exclusive and non-preemptive access to the bus.

SUMMARY OF THE INVENTION

The present invention relates to a computer system subject to an external condition, including a plurality of peripheral devices operatively coupled with a bus. The computer system includes a bus arbiter having a primary acknowledge output coupled with a particular one of the peripheral devices. The bus arbiter provides a PRIMARY ACKNOWLEDGE signal on the primary acknowledge output in response to the external condition. The particular one of the plurality of the peripheral devices receives a time-bound access to the bus when the PRIMARY ACKNOWLEDGE signal is provided.

The present invention also relates to a bus arbiter for use in a computer system having a bus, a first master and a plurality of second bus masters. The first bus master and the plurality of the second bus masters are coupled to the bus. The bus arbiter includes a primary request input coupled to the first bus master, a plurality of secondary request inputs coupled to the plurality of the second bus masters, a primary acknowledge circuit coupled to the primary request input, a secondary logic circuit coupled to the plurality of the secondary request inputs, and a lock monitor circuit coupled to the secondary logic circuit and a bus. The secondary logic circuit has a secondary output coupled to the primary logic circuit, and the lock monitor circuit provides a fairness signal. The secondary logic circuit provides a secondary select signal at the secondary output in accordance with a plurality of SECONDARY REQUEST signals received at the plurality of the secondary request inputs and the fairness signal. The primary logic circuit provides a primary select signal in response to a PRIMARY REQUEST signal on the primary request input and the secondary select signal. The primary logic circuit grants access to the bus in accordance with the primary select signal. The primary select signal grants access to the first bus master when the PRIMARY REQUEST signal is received.

The present invention further relates to a dockable computer system comprised of a host computer unit including a station bus and a mobile computer unit including a unit bus. The dockable computer system is capable of residing in a docked state in which the mobile computer unit is operatively associated with the host computer station and an undocked state in which the mobile computer unit is physically separate from the host computer station. The dockable computer system also includes a docking agent which is coupled to the unit bus and provides a quiet request signal in response to the system changing between states. The improvement includes a bus arbiter having a quiet bus request input coupled to the docking agent. The bus arbiter grants control of the unit bus to the docking agent in response to the QUIET BUS request signal.

The present invention additionally relates to a method of docking or undocking a portable computer having a computer bus and a host station having a host bus. The portable computer includes a docking agent coupled to the computer bus for quieting the computer bus, peripheral devices coupled to the computer bus, a bus arbiter for granting access to the computer bus, and a notice circuit for generating a notice signal in response to docking or undocking the portable computer. The computer bus is physically, electrically coupled to the host bus when the portable computer is docked with the host station. The method comprises the steps of granting time-bound access to the computer bus to the docking agent in response to the notice signal, the docking agent quieting the computer bus in response to being granted access by the bus arbiter, coupling or uncoupling the host bus and the computer bus, and allowing the peripherals to have access to the computer bus after the host bus and computer bus are coupled or uncoupled.

The present invention still further relates to a portable computer for use in a dockable computer system, capable of assuming at least two states, a docked state and an undocked state. The dockable computer system includes a notice circuit before providing a notice signal when the dockable computer system is about to change states, and a host station including a host bus coupled to a host connector. The portable computer includes a computer connector, a computer bus coupled to the computer connector, a docking agent coupled to the computer bus and a bus arbiter. The host connector is physically coupled to the portable connector when the dockable computer system is in the docked state, and the host connector is physically separate from the computer connector when the dockable computer system is in the undocked state. The docking agent includes a quiet request output and provides a quiet request signal. The bus arbiter is coupled to the quiet request output and grants ownership of the computer bus to the docking agent in response to the quiet request signal.

The present invention advantageously provides a bus arbiter optimized for allowing a peripheral device to respond to an external situation. The bus arbiter can provide an exclusive, non-preemptive access to the bus so a particular peripheral device may quickly respond to the external situation. The bus arbiter can also provide a time-bound access to the bus so a peripheral device can respond to the external situation in a minimum amount of time.

In one aspect of the present invention, the bus arbiter is employed in a dockable computer system and grants access to the bus to a docking agent in response to a docking event. In another aspect of the present invention, the bus arbiter grants access to a digital signal processing peripheral device in an audio-capable computer system so that "sound glitches" are avoided. In still a further aspect of the present invention, the bus arbiter includes a dedicated primary request input for receiving a request for a time-bound access to the bus. In yet another aspect of the present invention, the bus arbiter may provide a BACKOFF signal which requests the termination of the current bus transaction.

BRIEF DESCRIPTION OF THE DRAWINGS

The invention will hereafter be described with reference to the accompanying drawings, wherein like numerals denote like elements, and.

DETAILED DESCRIPTION OF THE PREFERRED EXEMPLARY EMBODIMENTS

Figure 1:
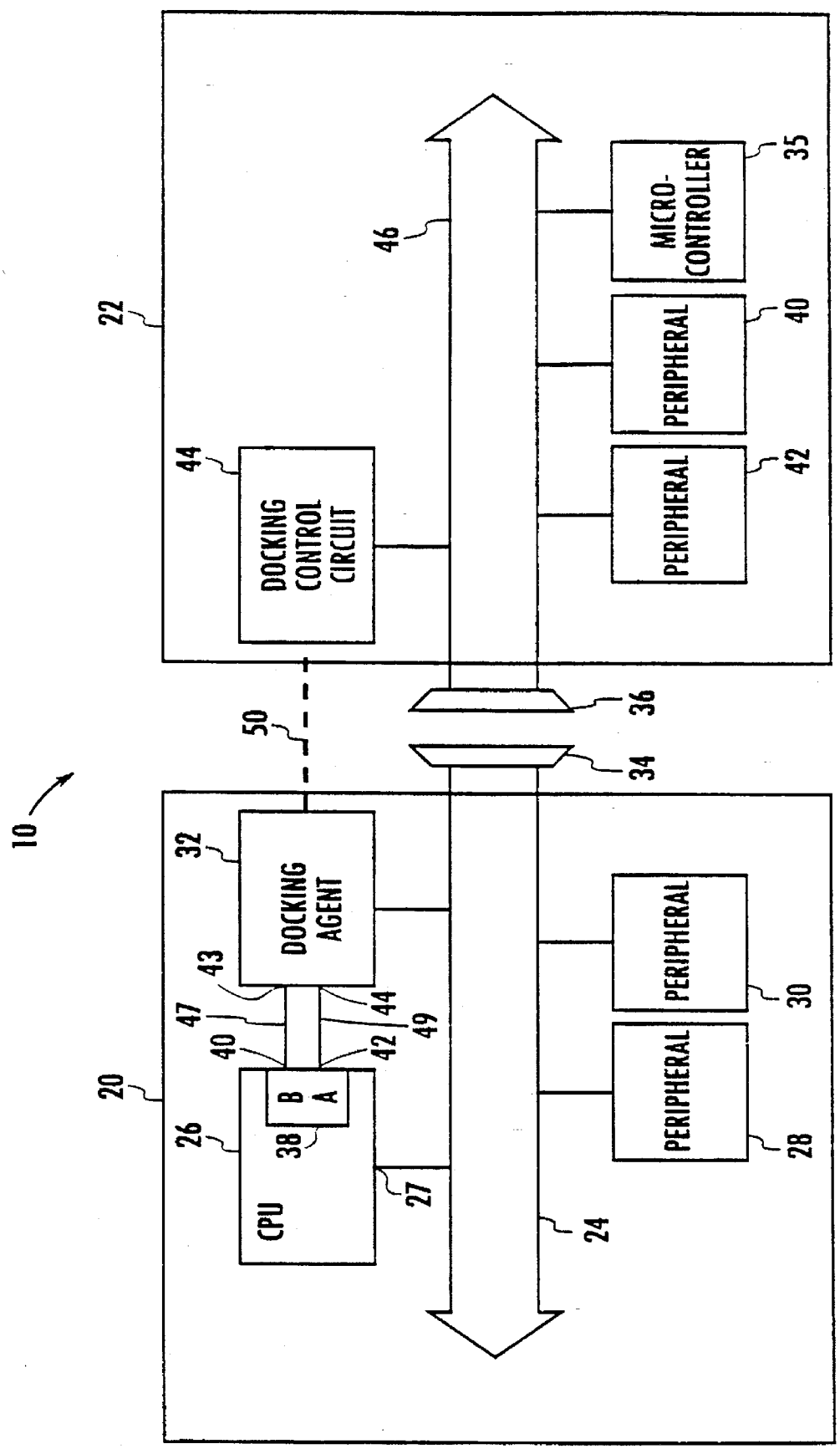
FIG. 1 schematically illustrates a dockable computer system employing a first exemplary embodiment of the present invention.

FIG. 1 is a schematic block diagram of a dockable computer system 10 including a portable computer 20 and a docking (host) station 22. Portable computer 20 is a mobile computer unit including a CPU 26, a system bus 24, a bus arbiter 38 and a docking agent 32. Portable computer 20 can also include a peripheral device 28 and a peripheral device 30. System bus 24 couples CPU 26, peripheral device 28, peripheral device 30 and docking agent 32. An external connector 34 is also coupled with system bus 24. System bus 24 can be a CPU-to-memory bus, an I/O bus, a standard bus, PCI bus, a sub-bus, a span bus or any other type of bus functionally operative in the microcomputer environment. Alternatively, components of computer system 10 can be coupled together via bridges, sub-buses and other conductors (not shown), and CPU 26 can be coupled to bus 24 via a host/PCI bus bridge (not shown).

Docking station 22 includes a docking control circuit 44 coupled to a docking bus 46. Docking station 22 can also include a microcontroller 35, a peripheral device 40 and a peripheral device 42. Microcontroller 35 can be replaced by a more powerful microprocessor as warranted by applications for system 10, and it is within the scope of the present invention to utilize a minicomputer as the host system should the user so desire. Docking station 22 is a host station which can have superior, equal or inferior computing power compared to portable computer 20.

Docking bus 46 couples docking control circuit 44, microcontroller 35, peripheral device 40 and peripheral device 42. An external connector 36 is also coupled to docking bus 46. Docking bus 46 can be a host-to-memory bus, an I/O bus, a standard bus, a PCI bus, a sub-bus, a span bus or any other type of bus as noted generally above.

When dockable computer system 10 is in an undocked state, external connectors 34 and 36 are not physically coupled. Therefore, in the undocked state, system bus 24 and docking bus 46 are not in physical, electrical communication. In this undocked state, portable computer 20 is operable as a stand-alone computer and is physically separate from docking station 22.

In the docked state, docking station 22 receives portable computer 20 so dockable computer system 10 operates as a single desktop computer or an integrated computer system. When dockable computer system 10 is in this docked state, external connectors 34 and 36 are physically coupled. With connectors 34 and 36 coupled, CPU 26 can electrically communicate with components in docking station 22 such as peripheral device 42, peripheral device 40, or microcontroller 35 via system bus 24, connectors 34 and 36, and docking bus 46.

When dockable computer system 10 is about to change states (a docking event), dockable computer system 10 preferably provides an ADVANCE NOTICE signal warning of the impending docking event. Preferably, docking control circuit 44 includes circuitry for sensing an impending docking event and for communicating the ADVANCE NOTICE signal across a communication link 50, as described below.

The ADVANCE NOTICE signal can be provided on system bus 24, docking bus 46, communication link 50, or various control lines in dockable computer system 10. For example, when dockable computer system 10 changes from an undocked state to a docked state (an external event), communication link 50 preferably provides an infrared ADVANCE NOTICE (warning) signal which is received by docking agent 32. Communication link 50 can be an electromagnetic communication link, long pin interface, or wireless communication link such as those disclosed in U.S. patent application Ser. No. 08/217,952, filed Mar. 25, 1994, and entitled, "Dockable Computer System Capable of Electric and Electromagnetic Communication", assigned to the assignee of the present invention. Alternatively, portable computer 20 or docking station 22 can provide a software-actuated ADVANCE NOTICE signal or a user-actuated ADVANCE NOTICE signal.

Preferably, docking agent 32 operates to quiet or render inactive system bus 24 before it and docking bus 46 are physically coupled or uncoupled during a docking event. Docking agent 32 is shown as an off-line device which may or may not be involved in the non-docking operations of portable computer 20. Docking agent 32 operates similarly to a PCI agent device, host agent device, standard agent device or other device capable of quieting a bus.

Docking agent 32 quiets system bus 24 generally by ensuring that there are no active transfers occurring on bus 24 by asserting bus ownership over system bus 24, asserting bus mastership over bus 24, performing a software idle subroutine, performing an interrupt service routine which idles bus 24, or rendering bus 24 inactive. Docking agent 32 is preferably designed along the lines of that circuitry described in U.S. Pat. application Ser. No. 08/217,951, filed March 25, 1994, entitled "An Apparatus and Method for Achieving Hot Docking Capabilities for a Dockable Computer System."

Bus arbiter 38 is integrated within CPU 26 and includes a quiet request input 40 coupled to a quiet request control line 47 and a quiet acknowledge output 42 coupled to a quiet acknowledge control line 49. CPU 26 is able to monitor bus activity on bus 24 via a bus input 27. Bus input 27 preferably includes control lines for receiving signals such as a FRAME signal and an IRDY (Initiator Ready) signal utilized by the PCI protocol which indicate a transaction is occurring on bus 24. Docking agent 32 includes a quiet acknowledge input 44 coupled to quiet acknowledge control line 49, and a quiet request output 43 coupled to quiet request control line 47.

Bus arbiter 38 is advantageously integrated with CPU 26 so bus arbiter 38 is capable of disconnecting current bus cycles by providing an idle, stop, halt or other bus cycle control command to CPU 26 and peripheral devices 28 and 30. Alternatively, bus arbiter 38 may signal CPU 26 or a bus bridge (not shown) to disconnect the current bus cycle. Bus arbiter 38 can also be integrated with other components such as a host or PCI bus bridge (not shown).

Bus arbiter 38 generally assigns ownership of bus 24 to peripheral device 28, peripheral device 30, peripheral device 40 and peripheral device 42 in accordance with a fixed or rotational priority scheme and a fairness scheme. The fairness scheme overrides the fixed or rotational priority scheme to prevent locking errors such as lockouts, livelocks and deadlocks.

The operation of system 10 during an external situation such as a docking event is described below. Docking agent 32 provides a quiet request (primary request) signal on quiet request control line 47 in response to receiving the ADVANCE NOTICE signal on communication link 50. Bus arbiter 38 receives the QUIET REQUEST signal and deasserts all grants given to other bus masters such as CPU 26 and peripheral devices 28 and 30. After the current bus transaction on bus 24 is completed, bus arbiter 38 grants bus ownership to docking agent 32 by providing a quiet acknowledge (primary acknowledge) signal across quiet acknowledge control line 49. Docking agent 32 is able to quiet system bus 24 in response to receiving the QUIET ACKNOWLEDGE signal on quiet acknowledge control line 49. Alternatively, bus arbiter 38 may grant CPU 26 ownership of bus 24 for CPU-based bus quieting techniques.

The QUIET ACKNOWLEDGE signal can advantageously indicate that there are no active transfers occurring on bus 24. Because bus arbiter 38 has the capability to wait for the end of the current bus transaction, bus arbiter 38 may be configured to issue the QUIET ACKNOWLEDGE signal only when bus 24 is completely idle (docking state safe). Thus, bus arbiter 38 may signal docking agent 32 that bus 24 is quiet by providing the QUIET ACKNOWLEDGE signal and eliminate the need for additional bus cycle monitoring circuitry.

Preferably, bus arbiter 38 provides docking agent 32 with a time-bound access to bus 24, essentially to guarantee ownership of bus 24 to docking agent 32 upon request. In this preferred embodiment, time bound access refers to a high priority or primary access which allows agent 32 to gain control of bus 24 in an appropriate amount of time so that bus 24 may be prepared for the docking event. Bus arbiter 38 provides the time-bound access, preferably by employing a priority scheme which grants exclusive, non-preemptive access to bus 24 in response to the QUIET REQUEST signal. This priority scheme grants the exclusive, non-preemptive access despite the action of the fairness scheme and allows docking agent 32 to be granted access to bus 24 when other high priority bus masters such as CPU 26 and peripheral devices 28 and 30 contend for bus 24. Also, exclusive, non-preemptive access prevents other bus masters such as CPU 26, device 28, device 30, device 40 and device 42 from removing bus ownership from docking agent 32. Thus, this time-bound access ensures that bus 24 may be quieted in a minimum amount of time so catastrophic failure is avoided as bus 24 is docked or undocked with docking bus 46.

System and application parameters typically define the amount of time for the time-bound access and therefore the immediacy for granting ownership of bus 24 to docking agent 32. For instance, bus arbiter 38 may grant access to bus 24 in a particular amount of real time, such as less than 0.5 seconds. An access within 0.5 seconds assures that the user is not subject to a perceptible delay as system 10 changes states. Alternatively, bus arbiter 38 may grant access to bus 24 by waiting a particular number of bus transactions or clock cycles, by immediately disconnecting the current bus cycle, by comparing a time-of-day clock to a schedule, or by a software or user configured timing scheme. Thus, bus arbiter 38 is capable of granting an advantageous time-bound access to bus 24 in response to an external situation, thereby essentially guaranteeing access by agent 32 in an adequate amount of time.

Bus arbiter 38 is also capable of initiating a BACKOFF signal which causes the current bus master to complete its bus transaction in a particular number of bus cycles, thereby advantageously accelerating the granting of access to docking agent 32. The BACKOFF signal prevents bus masters such as CPU 26, peripheral devices 28 and 30 and even peripheral devices 40 and 42 from maintaining bus ownership for a prolonged period of time after docking agent 32 requests bus ownership. Thus, the BACKOFF signal can ensure that bus arbiter 38 grants a time bound access to docking agent 32.

Portable computer 20 and docking station 22 illustrated in FIG. 2 operate similarly to dockable computer system 10 discussed with reference to FIG. 1. However, dockable computer system 10 in FIG. 2 includes a docking agent 33 and a docking control circuit 45 shown to be in-line devices and a bus arbiter 52 shown to be a stand-alone, off-line device. Docking agent 32 and docking control circuit 44 (FIG. 1) may be utilized with bus arbiter 52 in FIG. 2. Alternately, bus arbiter 52 may be integrated with CPU 26 thereby enabling bus arbiter 52 to disconnect current bus cycles on bus 24.

Docking agent 33 is coupled between system bus 24 and a connector bus 25. Docking control circuit 45 is coupled between a connector bus 47 and docking bus 46. Connector bus 25 is preferably coupled to external connector 34 and connector bus 47 is preferably coupled to external connector 36. Docking agent 33 preferably quiets connector bus 25 when system 10 is about to change states. Docking control circuit 45 also quiets connector bus 47 when system 10 is about to change states. Docking agent 33 and docking control circuit 45 can additionally quiet system bus 24 and docking bus 46.

Docking agent 33 and docking control circuit 45 operate as in-line devices and can isolate connector bus 25 from system bus 24 and connector bus 47 from docking bus 46. Docking agent 33 and docking control circuit 45 preferably include filter capability, drive capability, voltage level translation capability and buffering capability. Buffering capability can include tri-stated inputs and outputs for isolating buses 24 and 46 by utilizing a high impedance state.

Bus arbiter 52 operates similarly to bus arbiter 38 and includes a bus input 41 which enables bus arbiter 52 to monitor the activity on bus 24. Bus arbiter 32 provides a time-bound priority scheme for granting access to bus 24 or bus 25 to docking agent 33. Alternatively, bus arbiter 52 may grant CPU 26 ownership of bus 24 for CPU-based bus quieting techniques.

Figure 2:
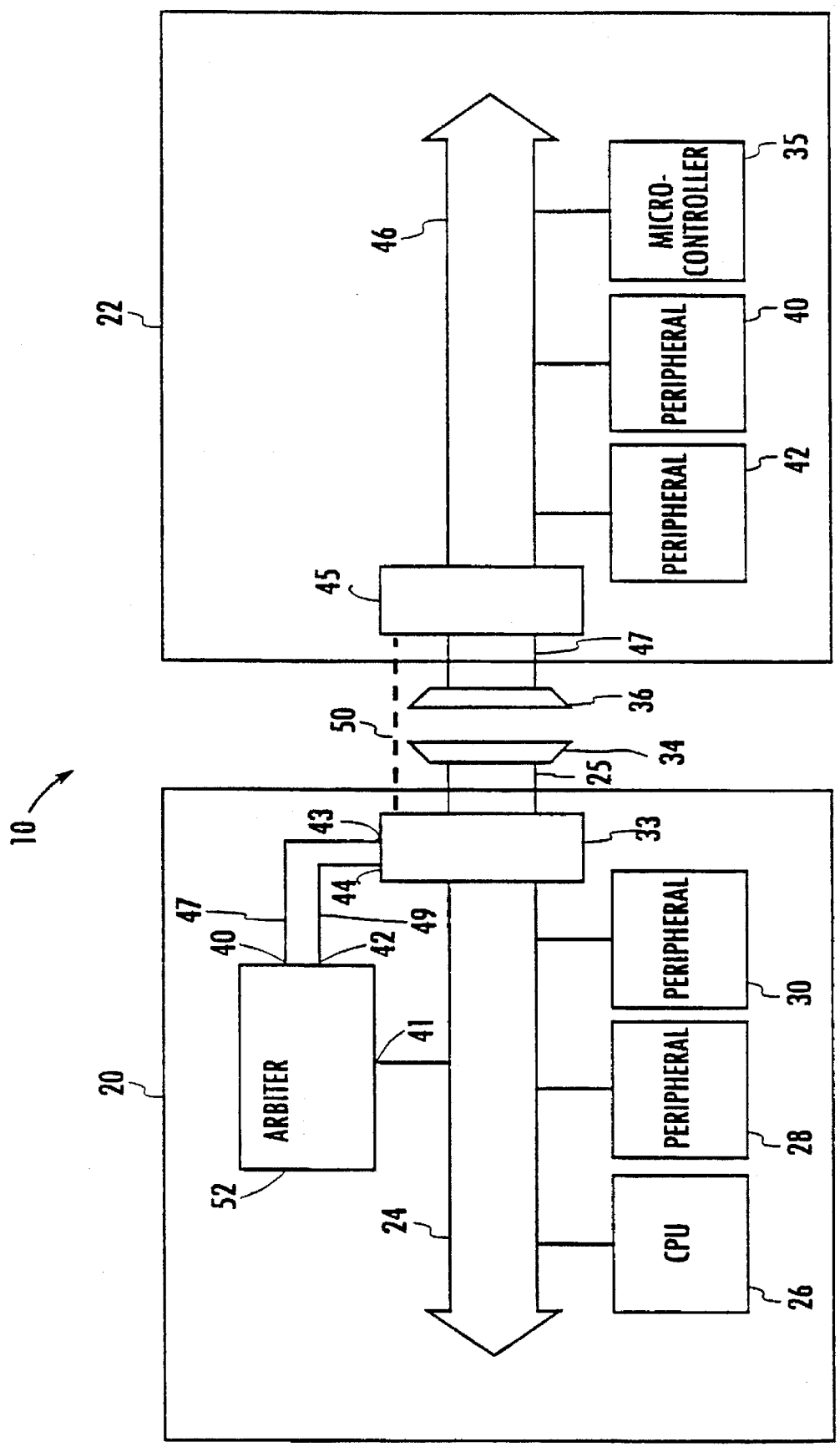
FIG. 2 schematically illustrates a dockable computer system employing a second exemplary embodiment of the present invention.
Figure 3:
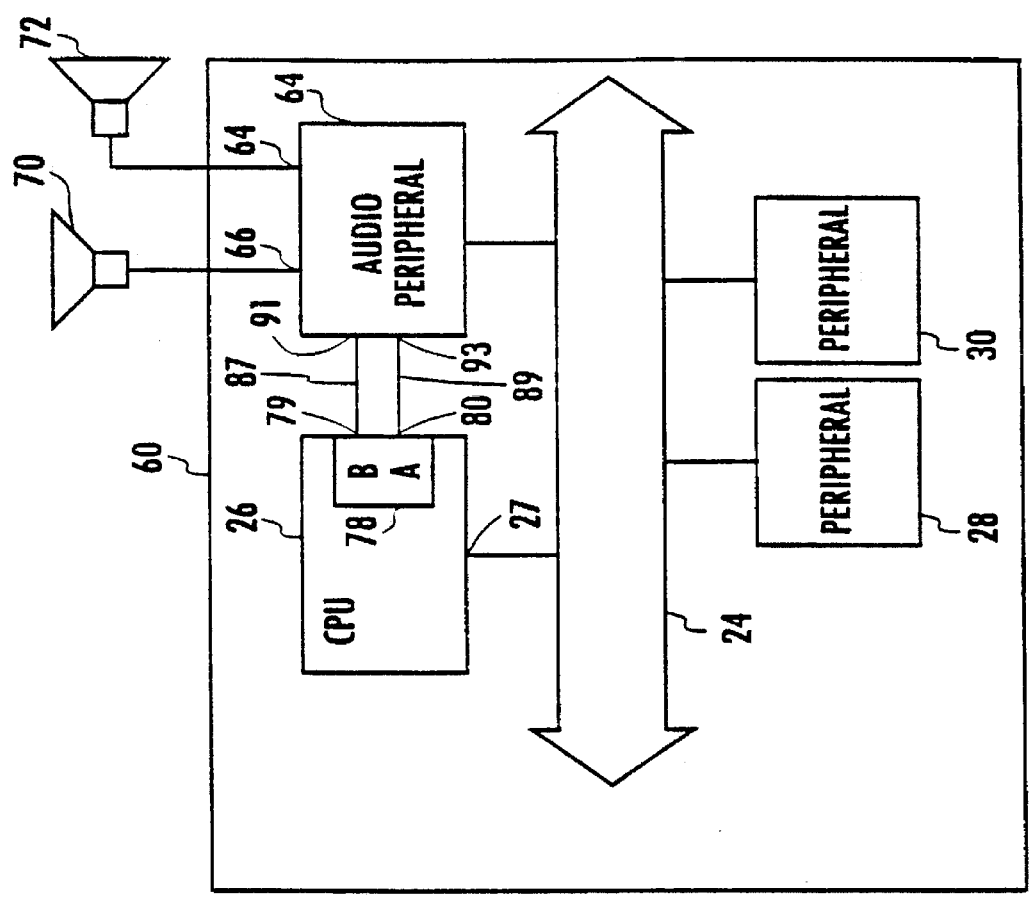
FIG. 3 schematically illustrates an audio-capable system employing a third exemplary embodiment of the present invention.

FIG. 3 is a schematic diagram of an audio-capable computer system 60 including CPU 26, a peripheral device 28, peripheral device 30, system bus 24, an audio peripheral device 64 and a bus arbiter 78. Bus arbiter 78 is advantageously integrated with CPU 26. Alternatively, bus arbiter 78 can be a stand-alone device similar to bus arbiter 52 (FIG. 2). Audio peripheral device 64 is a digital signal processing component including an output 66 coupled to a speaker 70 and an output 68 coupled to a speaker 72. Audio peripheral device 64 provides audio signals to speakers 70 and 72; speakers 70 and 72 provide sound in response to the audio signals.

Bus arbiter 78 (FIG. 3) is similar to bus arbiters 38 and 52 (FIGS. 1 and 2). Bus arbiter 78 includes a primary request input 79 coupled to a primary request control line 87 and a primary acknowledge output 80 coupled to a primary acknowledge control line 89. A primary request output 91 of peripheral device 64 is coupled to primary request control line 87 and a primary acknowledge input 93 of device 64 is coupled to primary acknowledge control line 89.

Audio peripheral device 64 performs operations on digital data to generate the audio signals at outputs 66 and 68 for speakers 70 and 72. These operations require the audio peripheral device 64 to have access to bus 24 to read and write the digital data in memory (not shown) or other components (not shown) associated with computer system 60. When audio peripheral device 64 must have access to bus 24 to generate the audio signals, audio peripheral device 64 provides a PRIMARY REQUEST signal on primary request control line 87. Generally, audio peripheral device 64 must have immediate access to bus 24 to prevent the occurrence of so-called "sound glitches". These "sound glitches" manifest themselves as clicks, crackles, or other audibly detectable distortions.

Bus arbiter 78 preferably deasserts all grants given to other bus masters such as CPU 26, peripheral device 28 or peripheral device 30 and grants bus ownership to audio peripheral device 64 by providing a PRIMARY ACKNOWLEDGE signal across primary acknowledge control line 89. Bus arbiter 78 provides a time-bound approach for ensuring ownership of bus 24 is granted to audio peripheral device 64 in a minimum amount of time. Bus arbiter 78 grants access to bus 24 within a particular amount of time, such as 0.1 seconds, related to parameters of system 60 like the size of digital data storage (not shown) within audio peripheral device 64, speed of device 64, or audio resolution of the digital data. Preferably, ownership of bus 24 is granted in response to an external requirement such as the prevention of "sound glitches."

Figure 4:
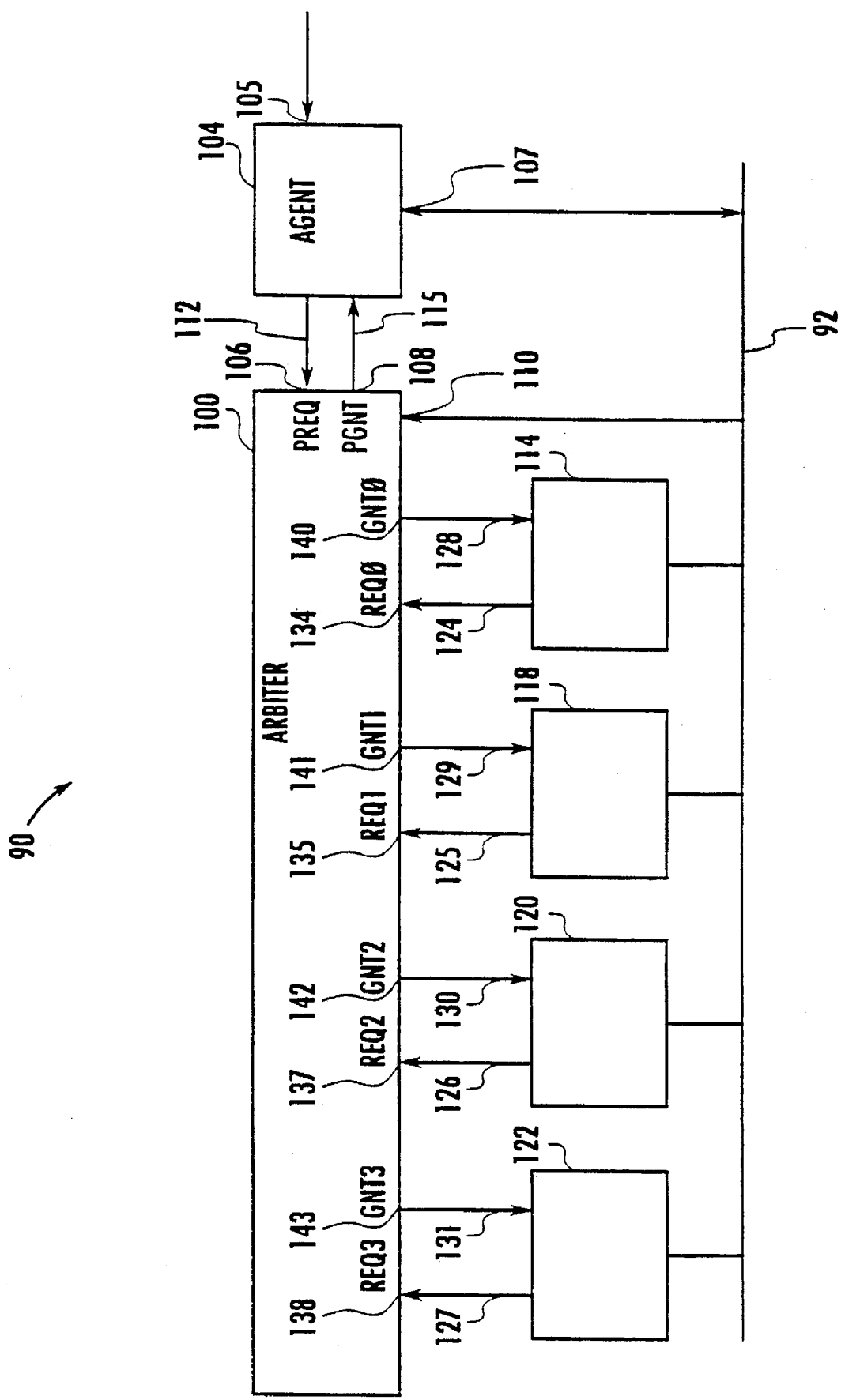
FIG. 4 is a more detailed schematic block diagram of a bus arbiter in accordance with the present invention for use in the systems illustrated in FIGS. 1-3.

FIG. 4 illustrates a bus arbiter 100 which is appropriate for use in a system 90. System 90 may be similar to system 10 or system 60 illustrated in FIGS. 1–3. Bus arbiter 100 includes a primary (quiet) request input 106 coupled to a primary request line 112, and secondary request inputs 134, 135, 136 and 137. Bus arbiter 100 also includes a primary (quiet) acknowledge output 108 coupled to a primary acknowledge line 115 and secondary acknowledge outputs 140, 141, 142 and 143. An agent 104 is coupled to primary request line 112 and primary acknowledge line 114. Preferably, agent 104 is a bus master similar to docking agent 32, docking agent 33 or audio peripheral device 64 (FIG. 1–3).

Bus arbiter 100 is also coupled to a peripheral device 114 via a secondary request line 124 and secondary acknowledge line 128, a peripheral device 118 via a secondary request line 125 and a secondary acknowledge line 129, a peripheral device 120 via a secondary request line 126 and a secondary acknowledge line 130, and a peripheral device 122 via a secondary request line 127 and a secondary acknowledge line 131. Secondary acknowledge outputs 140–143 are coupled to secondary acknowledge lines 128–131, respectively; secondary request inputs 134–137 are coupled to secondary request lines 124–127, respectively. Peripheral devices 114, 118, 120 and 122 are bus masters coupled to bus 92.

Arbiter 100 also includes a bus monitoring input 110 coupled to bus 92. Agent 104 is coupled to bus 92 at a bus input 107 and includes an external input 105. Bus arbiter 100 can also include a request/grant pair (not shown) coupled to a CPU such as CPU 26 (not shown).

In operation, bus arbiter 100 receives SECONDARY REQUEST signals on secondary request inputs 134–137. Bus arbiter 100 employs a fixed or rotational priority scheme and a fairness scheme which services the SECONDARY REQUEST signals and grants bus ownership to one of peripheral devices 114, 118, 120, and 122. Bus arbiter 100 monitors the transactions on bus 102 by receiving signals on bus monitor input 110. Bus arbiter 100 provides SECONDARY ACKNOWLEDGE signals to peripheral devices 114, 118, 120, and 122 on secondary acknowledge lines 128–131, respectively, in response to the transactions on bus 102, the rotational or fixed priority scheme and the fairness scheme.

Bus arbiter 100 is configured to provide a time-bound access to bus 92 in response to a PRIMARY REQUEST signal on primary request line 112. Arbiter 100 essentially is capable of guaranteeing agent 104 access to bus 102 in a particular amount of time after receiving the PRIMARY REQUEST signal despite the operation of the rotational or fixed priority scheme and the fairness scheme. When bus arbiter 100 receives the PRIMARY REQUEST signal on primary request line 112 at primary request input 106, bus arbiter 100 provides a PRIMARY ACKNOWLEDGE signal at primary acknowledge line 115. Agent 104 is thus given time-bound access to bus 102. As discussed above with reference to FIG. 1, time-bound access refers to a high priority access which allows agent 104 to respond to the external situation in a sufficient amount of time.

Agent 104 may provide the PRIMARY REQUEST signal in response to an external signal such as a notice signal provided on external input 105. Alternatively, agent 104 may provide the PRIMARY REQUEST signal in response to a timer or other device which indicates an external condition requiring agent 104 to access bus 102. Such external conditions include a docking event or "sound glitch" prevention.

Figure 5:
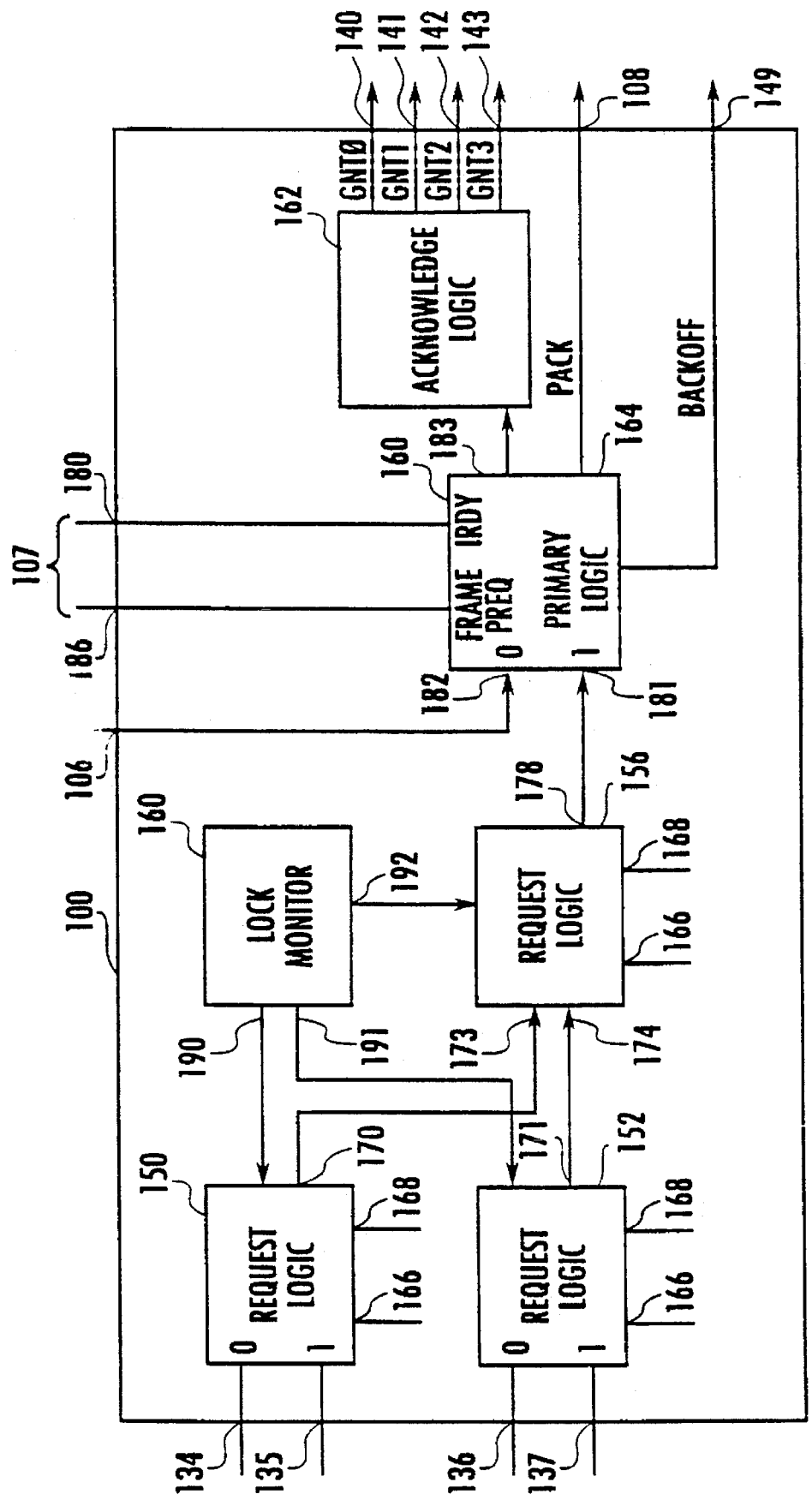
FIG. 5 is a more detailed schematic block diagram of the bus arbiter illustrated in FIG. 4.

FIG. 5 illustrates a more detailed diagram of bus arbiter 100 including a request logic circuit 150, a request logic circuit 152, a request logic circuit 156, a lock monitor 160, a primary logic circuit 164 and an acknowledge circuit 162. Request logic circuit 150 is coupled to secondary request inputs 134 and 135, and request logic circuit 152 is coupled to secondary request inputs 136 and 137. Bus arbiter 100 also includes a FRAME input 180 and an IRDY input 186 as part of bus monitor input 107.

Each of request logic circuits 150, 152 and 156 includes a priority select input 166 and a rotate enable input 168 coupled to an arbiter configuration register (not shown) which allows the fixed and rotational schemes of arbiter 100 to be programmatically configured and controlled. Logic circuits 150, 152, 154 and 164 are custom logic designs which implement a two input priority scheme. For example, the custom logic design of circuit 150 can implement a fixed priority scheme which selects secondary request input 134 when inputs 134 and 135 compete. In this scheme, the custom logic design utilizes logic gates to ignore input 135 whenever the SECONDARY REQUEST signal on input 134 is asserted. Alternatively, logic circuits 150, 152, 154 and 164 may be implemented in software executed by CPU 26 or other processing device (not shown).

Request logic circuit 150 determines the priority of any contending SECONDARY REQUEST signals on secondary request inputs 134 and 135 and provides the highest priority request signal at an output 170. Similarly, request logic circuit 156 provides the highest priority request signal of the SECONDARY REQUEST signals on secondary request inputs 136 and 137 at an output 171. Request logic circuit 156 receives the signals on outputs 170 and 171 at inputs 173 and 174, respectively, and provides the highest priority request signal of the signals on outputs 170 and 171 at an output 178.

Lock monitor 160 preferably provides a fairness scheme, algorithm or other override circuit for ensuring that locking errors such as lockouts, deadlocks or livelocks do not occur in system 90. Such locking errors may occur due to combinations of write-back cache transactions and locked/exclusive bus transactions and are disadvantageous because certain peripheral devices, such as devices 114, 118, 120 and 122 (FIG. 4), may be permanently denied access bus 92. Also, such locking errors can cause a malfunction on bus 92 and even a hardware failure of system 90. Lock monitor 160 preferably provides a fairness signal at outputs 190, 191 and 192. The priority scheme of circuits 150, 152 and 156 is adjusted according to the fairness signal so locking errors do not occur. Therefore, lock monitor 160 is advantageously capable of overriding the priority scheme of circuits 150, 152 and 156 and granting access to a particular peripheral device in the group of devices 114, 118, 120 and 122, to ensure that bus 92 is not susceptible to a locking error.

Primary logic circuit 132 receives the signal on output 178 at an input 181. The signal on output 178 is indicative of the highest priority device of devices 114, 118, 120 and 122 in accordance with the priority scheme of logic circuits 150, 152 and 156 and the fairness scheme of lock monitor 160. Primary logic circuit 164 receives the signal on output 178 at input 181 and the PRIMARY REQUEST signal at an input 182. Primary logic circuit 164 provides the signal at input 181 to output 183 if a PRIMARY REQUEST signal is not present at primary request input 106.

Acknowledge circuit 162 receives a signal at output 183 and provides the appropriate SECONDARY ACKNOWLEDGE signal to the proper peripheral device in the group of devices 114, 118, 120 and 122 on secondary acknowledge outputs 140-143. Acknowledge circuit 162 is preferably a decoder or other logic device for translating the signal on output 183 to an appropriate SECONDARY ACKNOWLEDGE signal on one of secondary acknowledge outputs 140-143. If there is no signal at output 183, acknowledge circuit 162 removes all SECONDARY ACKNOWLEDGE signals on output 140-143.

Primary logic circuit 164 removes the signal on output 183 in response to the PRIMARY REQUEST signal on primary request input 106 and provides a PRIMARY ACKNOWLEDGE signal at primary acknowledge output 108 when the current bus cycle is complete. Primary logic circuit 164 advantageously ignores the signal at input 181 and ensures that the fairness scheme is overridden when there is a PRIMARY REQUEST signal at input 182. Thus, the primary logic circuit 164 provides agent 104 time-bound access to bus 92.

Primary logic circuit 164 may also advantageously provide a BACKOFF signal at a BACKOFF input 149 to accelerate the completion of the current bus transaction on bus 92. For example, primary logic circuit 164 may be configured to provide the BACKOFF signal in response to receiving the PRIMARY REQUEST signal when FRAME input 186 and IRDY input 188 indicate bus 92 is currently being accessed by a CPU (not shown) or one of peripheral devices 114, 118, 120 and 122. Alternatively, primary logic circuit 164 may utilize other bus monitoring techniques for determining whether bus 92 is currently being used.

Figure 6:
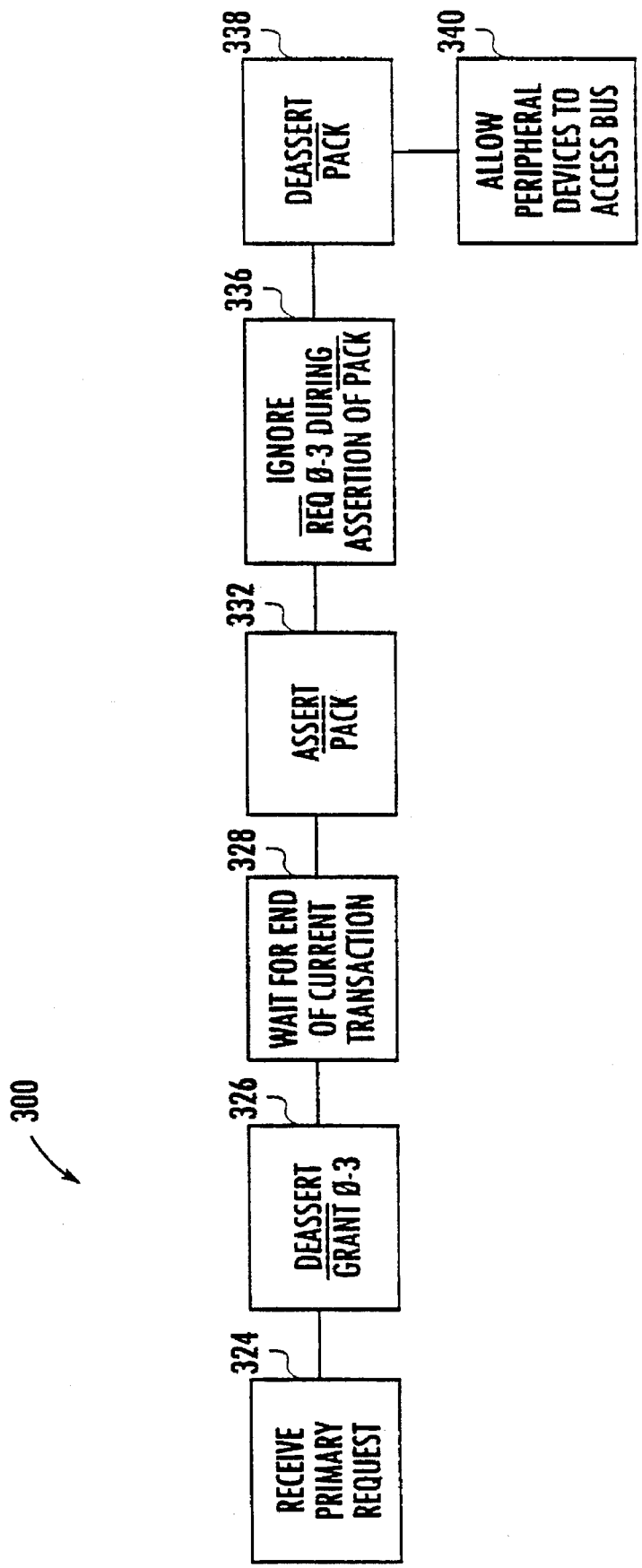
FIG. 6 is a simplified flow chart of the operation of the bus arbiter illustrated in FIG. 4.

FIG. 6 is a flow chart of the operation of bus arbiter 38, 52, 78 or 100. For ease of discussion, external situation 300 is discussed with reference to FIGS. 4 and bus arbiter 100. External situation 300 may involve coupling or uncoupling of bus 92 to a bus of a docking station (docking event) or a prevention of a "sound glitch" in system 90.

Agent 104 preferably receives an external signal at external input 105 when external situation 300 is initiated. Alternatively, agent 104 may internally monitor external situation 300. Agent 104 preferably provides the PRIMARY REQUEST signal to primary request line 112 in response to the external signal or internal monitoring. Bus arbiter 100 deasserts all SECONDARY ACKNOWLEDGE signals provided on any secondary acknowledge lines 128-131 in response to the PRIMARY REQUEST signal (at block 226). More particularly, when primary logic circuit 164 receives the PRIMARY REQUEST signal at input 182, primary logic circuit 164 removes the signal at output 183. Acknowledge circuit 102 removes all signals on outputs 140-143 in response to the removal of the signal at output 183.

Next, bus arbiter 100 monitors bus 92 at bus input 107 to determine the end of a current bus transaction occurring on bus 92 (at block 328). More particularly, bus arbiter 100 determines if either the FRAME signal at FRAME input 186 or the IRDY signal at IRDY input 188 is asserted. According to PCI protocol, if either signal is asserted, the current bus transaction is occurring on bus 92. When both the FRAME and IRDY signal are absent, the current bus transaction is complete.

Bus arbiter 100 may advantageously provide a BACKOFF signal at output 149 to accelerate the termination of the current bus transaction or simply wait for the current transaction to be completed. The BACKOFF signal is received by the bus masters such as devices 114, 118, 120 and 122 in system 90. Preferably the bus masters terminate their bus transaction in a particular number of bus cycles in response to the BACKOFF signal. After the current bus transaction is completed, bus arbiter 100 asserts a PRIMARY ACKNOWLEDGE signal at primary acknowledge output 108 (at block 232). Agent 104 preferably gains access of bus 92 in response to receiving the PRIMARY ACKNOWLEDGE signal.

Bus arbiter 100 ignores all requests provided by the CPU and peripheral devices 114, 118, 120 and 122 as long as the PRIMARY REQUEST signal is received at primary request input 106 (at block 336). After agent 104 or other circuitry determines that access to bus 92 is no longer needed to service the external situation, agent 104 removes the PRIMARY REQUEST signal provided at primary request line 112. When arbiter 100 determines that the PRIMARY REQUEST signal has been deasserted at primary request input 100, bus arbiter 100 deasserts the PRIMARY ACKNOWLEDGE signal at quiet acknowledge output 114 (at block 338).

After the PRIMARY ACKNOWLEDGE signal is deasserted, bus arbiter 100 allows the CPU and peripheral device 114, 118, 120 and 122 to access bus 92 in response to SECONDARY REQUEST signals on secondary request lines 124-127 (at block 340). Thus, after external situation 300 is serviced, bus arbiter 100 provides normal bus arbitration operations for system 90.

It is understood that, while the detailed drawings and specific examples given describe preferred exemplary embodiments of the present invention, they are for the purpose of illustration only. The apparatus and method of the invention are not limited to the precise details and conditions disclosed. For example, although a bus arbiter is shown coupled directly with the docking agent, the bus arbiter could communicate across the system bus, a communication link, bridges or through other components. In this application, devices are coupled when they are able to communicate signals without functionally destroying the meaning of the signals; intermediate structures located between the devices do not render them uncoupled. Also, although the system bus is shown, a sub-bus or secondary bus could be utilized. Although a portable computer is described, the system is appropriate for any mobile computer unit including personal digital assistants (PDAs). Further, single lines in the various drawings can represent multiple conductors. Various changes can be made to the details disclosed without departing from the spirit of the invention which is defined by the following claims.

We claim:

1. A portable computer for use in a dockable computer system capable of assuming at least two states, a docked state and undocked state, said dockable computer system including a notice circuit for providing a notice signal when said dockable computer system is about to change states, and a host station including a host bus communicating with a host connector, said portable computer comprising:

a central processing unit;

a computer connector;

a connector bus coupled to said computer connector;

a computer bus communicating to said computer connector via said connector bus, said central processing unit coupled to said computer bus, said host connector physically coupled with said computer connector when said dockable computer system is in said docked state, said host connector being physically separate from said computer connector when said dockable computer system is in said undocked state;

an in-line docking agent communicating with said computer bus, said docking agent including a QUIET REQUEST output to provide a QUIET REQUEST signal, said docking agent being coupled between said host bus and said computer bus when said system is in the docked state, said docking agent being coupled between said connector bus and said computer bus, said docking agent being capable of providing buffering or driving capabilities for said computer bus; and a bus arbiter receiving said QUIET REQUEST signal, said bus arbiter granting ownership of said computer bus to said docking agent in response to said QUIET REQUEST signal, wherein said docking agent quiets said computer bus and said connector bus by ensuring that there are no active transfers occurring on said computer bus and said connector bus when said bus arbiter grants ownership of said computer bus to said docking agent, wherein said portable computer remains powered on and said central processing unit remains operational while said portable computer changes between said two states.

2. The portable computer of claim I, wherein said bus arbiter includes a QUIET BUS ACKNOWLEDGE output communicating with said docking agent, said bus arbiter providing a QUIET BUS ACKNOWLEDGE signal at said QUIET BUS ACKNOWLEDGE output in response to said QUIET REQUEST signal.

3. The portable computer of claim 2, wherein said bus arbiter further includes a plurality of secondary bus request inputs and a plurality of secondary bus grant outputs, said bus arbiter including a lock monitor circuit, the lock monitoring circuit ensuring that locking errors do not occur on said computer bus.

4. The portable computer of claim 3, wherein said bus arbiter grants an exclusive, non-preemptive access to said computer bus to said docking agent in response to said QUIET REQUEST signal.

5. The portable computer of claim 4, wherein said bus arbiter includes a fixed priority scheme for assigning a priority for said plurality of secondary bus request inputs.

6. The portable computer of claim 4, wherein said bus arbiter includes a rotational priority scheme for providing a priority for said plurality of secondary bus request inputs.

7. The portable computer of claim 1, further comprising a microprocessor integrated with said bus arbiter.

8. The portable computer of claim 7, wherein said microprocessor disconnects a current bus transaction in response to said bus arbiter receiving said QUIET REQUEST signal.

9. The portable computer of claim 1, further comprising:

a wireless communication link electromagnetically coupling said portable computer to said host station, said portable computer communication messages to said host station via said wireless communication link, said in-line docking agent providing said quiet request signal in response to a connect message on said wireless communication link.

10. The portable computer of claim 9 wherein said host station includes a docking control circuit coupled to said wireless communication link and said host bus.

11. The portable computer of claim 10 wherein said docking control circuit includes tri-state buffers and is coupled between said host bus and said computer bus.

12. The portable computer of claim 10 wherein the connect message is generated by a docking control circuit in said host station.

13. A method of docking a portable computer having a computer bus and a host station having a host bus, said portable computer including a processor, a notice circuit for generating a notice signal in response to an impending docking or undocking of said portable computer, an in-line docking agent coupled between said computer bus and a connector bus, said in-line docking agent communicating with said computer bus and generating a PRIMARY REQUEST signal in response to said notice signal, and peripheral devices communicating with said computer bus, a bus arbiter for granting access to said computer bus, said computer bus being physically, electrically coupled with said host bus when said portable computer is docked with said host station, said docking agent being coupled between said host bus and said computer bus when said portable computer is docked with said host station, said method comprising the steps of:

granting time bound access to said computer bus to said docking agent in response to said PRIMARY REQUEST signal, said docking agent quieting said computer bus and said connector bus by ensuring that there are no active transfers occurring on said computer bus and said connector bus, in response to being granted access by said bus arbiter;

coupling said host bus and said computer bus;

buffering data signals between host data lines on said host bus and portable computer data lines on said computer bus with said docking agent; and allowing said peripherals to have access to said computer bus after said host bus and computer bus are coupled, whereby said portable computer remains powered on without suspending operation of said processor when said portable computer is docked with said host station.

14. The method of claim 13 wherein a current transaction is occurring on said computer bus, further comprising the step of:

waiting for said current transaction on said computer bus to be completed before said granting step.

15. The method of claim 13, wherein all requests for said computer bus are ignored when said docking agent is granted access to said computer bus.

16. The method of claim 13, further comprising the step of providing a BACKOFF signal which requests termination of a current bus transaction on said computer bus, wherein said docking agent further performs voltage level translation and drive functions for said signals.

17. The method of claim 16, wherein said peripheral devices terminate said current bus transaction within a preselected number of bus cycles in response to said BACKOFF signal.

18. In a dockable computer system comprised of a host computer station, including a station bus, and a mobile computer unit including a unit bus, wherein said system is capable of residing in at least two distinct states, a docked state in which said mobile computer unit is operatively associated with said host computer station and an undocked state in which said mobile computer unit is physically separate from said host computer station, an improvement comprising of:

an in-line mobile docking agent coupled between a first connector bus and said unit bus, said in-line mobile docking agent providing a QUIET REQUEST signal in response to said system changing between said states;

a bus arbiter receiving said QUIET REQUEST signal, said bus arbiter granting control of said unit bus to said docking agent in response to said QUIET REQUEST signal, wherein said docking agent quiets said unit bus and said first connector bus by ensuring that there are no active transfers occurring on said computer bus and said first connector bus in response to being granted control of said unit bus; and a station docking control circuit coupled between a second connector bus and said station bus, said station docking control circuit quieting said station bus and said second connector bus by ensuring that there are no active transfers occurring on said computer bus and said second connector bus in response to said system changing between said states.

19. The improvement of claim 18 wherein said docking agent is an in-line docking agent coupled between said unit bus and said station bus when said dockable computer system is in said docked state, said in-line docking agent performing buffering, filtering and voltage level translation functions for signals transmitted across said unit bus to said station bus.

20. The improvement of claim 18 wherein said station docking control circuit and said mobile docking agent are coupled by a wireless communication link and said mobile docking agent provides the quiet request signal in response to a connect message on the wireless communication link transmitted between said station docking control circuit and said mobile docking agent.

21. The improvement of claim 20 wherein the host docking control circuit is an in-line device coupled between the unit bus and the station bus and includes tri-state buffers.

22. The improvement of claim 19 wherein said unit bus and said station bus include data lines, and the filtering and translation functions are performed on data signals on said data lines.

23. The improvement of claim 22 whereby said mobile computer unit remains powered on when said system changes said states.

24. The improvement of claim 18 wherein said system includes a connector bus and said docking agent is coupled between said connector bus and said unit bus.

* * * * *